United States Patent
Haycock et al.

(10) Patent No.: US 7,328,361 B2
(45) Date of Patent: *Feb. 5, 2008

(54) DIGITAL BUS SYNCHRONIZER FOR GENERATING READ RESET SIGNAL

(75) Inventors: Matthew B. Haycock, Beaverton, OR (US); Amaresh Pangal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 11/141,262

(22) Filed: May 31, 2005

(65) Prior Publication Data

US 2005/0248367 A1  Nov. 10, 2005

Related U.S. Application Data

(63) Continuation of application No. 09/709,001, filed on Nov. 8, 2000, now Pat. No. 6,901,526.

(51) Int. Cl.
*G06F 1/04* (2006.01)
*G06F 1/12* (2006.01)

(52) U.S. Cl. .................................. 713/500
(58) Field of Classification Search ............... 713/500
See application file for complete search history.

(56) References Cited

U.S. PATENT DOCUMENTS

| | | | |
|---|---|---|---|
| 4,882,710 A * | 11/1989 | Hashimoto et al. | 365/189.05 |
| 5,268,932 A | 12/1993 | Okuzono | |
| 5,359,636 A | 10/1994 | Aoyama | |
| 5,623,644 A | 4/1997 | Self et al. | |
| 5,634,043 A | 5/1997 | Self et al. | |
| 5,809,257 A | 9/1998 | Shibazaki | |
| 6,279,077 B1 | 8/2001 | Nasserbakht et al. | |
| 6,622,198 B2 * | 9/2003 | Jones, Jr. | 711/101 |
| 6,901,526 B1 | 5/2005 | Haycock et al. | |

* cited by examiner

*Primary Examiner*—Rehana Perveen
*Assistant Examiner*—Eric Chang
(74) *Attorney, Agent, or Firm*—Schwegman, Lundberg & Woessner, P.A.

(57) ABSTRACT

A digital bus includes a transmitter unit, a receiver unit, and a transmission medium to couple the transmitter unit to the receiver unit and to provide a path for exchanging information between the transmitter unit and the receiver unit. The receiver unit includes a first-in-first-out (FIFO) unit and a synchronizer unit for receiving information from the transmitter unit. The synchronizer unit receives a plurality of write clock signals and a reset signal and generates a read reset signal positioned with respect to the plurality write clock signals and a sample clock signal. The read reset signal has a latency with respect to each of the plurality of write reset signals of between 0 and 1 clock cycles.

23 Claims, 9 Drawing Sheets

DIGITAL BUS SYNCHRONIZER FOR GENERATING READ RESET SIGNAL

RELATED APPLICATIONS(S)

This application is a continuation of U.S. application Ser. No. 09/709,001 filed Nov. 8, 2000 now U.S. Pat. No. 6,901,526 which is incorporated herein by reference.

FIELD

This invention relates to a digital bus and, more particularly to the synchronization of strobe or clock signals transmitted over the digital bus.

BACKGROUND

A digital bus provides circuits and a transmission medium for exchanging information between digital systems. A digital bus typically couples two or more systems that communicate using clocked data. Clocked data is data that is accompanied by a clock signal. The clock signal defines a time when the clocked data is valid. In one example system, a first processor controlling a data storage device, such as a disk drive, communicates with a second processor, such as a central processing unit (CPU), by sending and receiving information over a digital bus. In another example system, a CPU communicates with a memory, such as a solid state memory, by sending information to the memory and receiving information from the memory over a digital bus. The memory may be located on a die that includes the processor or located on a die that is separate from the processor.

Increasing the width of a bus connecting two digital systems generally increases the bandwidth of the bus. For example, early microprocessors typically transmitted and received information on four-bit and eight-bit buses, and generally supported only low bandwidth applications. Today, it is common to transmit information in digital systems on sixty-four bit buses, 128 bit buses, and 256 bit buses, all of which support high bandwidth applications. To reduce transmission errors, wide buses are subdivided into signaling groups. A signaling group typically comprises a plurality of data or information bits and an accompanying strobe or clock signal. A transition on the strobe or clock signal indicates that the accompanying data in the signaling group is valid. Unfortunately, because of manufacturing and electrical variations, such as strobe or clock transmission paths having different parasitic capacitances and strobe or clock driver and receiver circuits having different delays in different strobe and clock paths, the strobe or clock signals for each of the signaling groups on a bus may not arrive at a common receiving system at the same time. When strobe or clock information arriving at a receiving system are not synchronized, the receiving system cannot efficiently process the received data. One solution to this problem of skewed strobe or clock signals is to design the receiving system on the digital bus for the worst case arrival times of the strobes. Unfortunately, designing a bus for the worst case arrival times decreases the overall bandwidth of the system. Another solution to this problem of skewed strobe or clock signals is to synchronize a clock at the receiving system to the transmission clocks. Unfortunately, it is difficult to design a circuit that synchronizes a clock to multiple out-of-phase clocks or strobes without significantly reducing the bandwidth of the digital bus.

For these and other reasons there is a need for the present invention.

DETAILED DESCRIPTION

Figure 1:
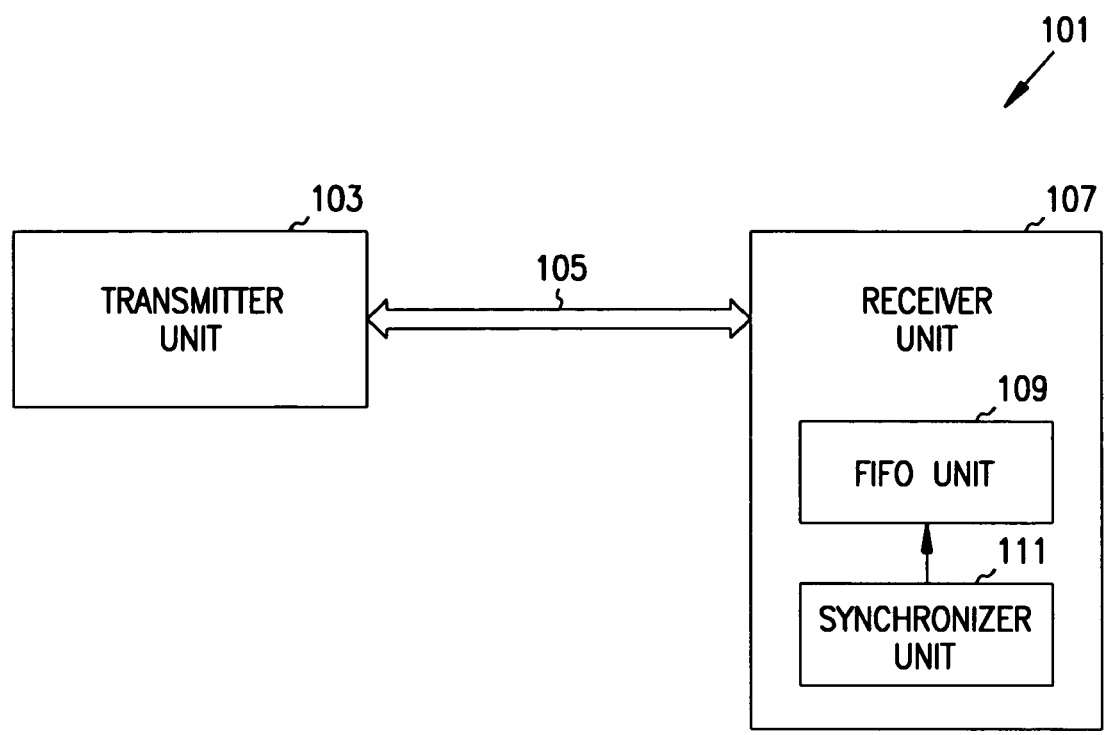
FIG. 1 is a block diagram illustrating one embodiment of a digital bus according to the present invention.

In the following detailed description of the invention, reference is made to the accompanying drawings which form a part hereof, and in which are shown, by way of illustration, specific embodiments of the invention which may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is not to be taken in a limiting sense, and the scope of the present invention is defined only by the appended claims, along with the full scope of equivalents to which such claims are entitled.

FIG. 1 is a block diagram of one embodiment of a digital bus 101 according to the teachings of the present invention. The digital bus 101 includes a transmitter unit 103, a transmission medium 105, and a receiver unit 107. The transmission medium 105 couples the transmitter unit 103 to the receiver unit 107 and provides a path for exchanging information between the transmitter unit 103 and the receiver unit 107.

The transmitter unit 103 is typically an electronic system capable of generating information in the form of digital signals that are transmitted to the receiver unit 107 over the transmission medium 105. Preferably, the transmitter unit 103 transmits a plurality of signaling groups. A signaling group includes one or more data signals or information bits and an accompanying strobe or clock signal. A transition on the strobe or clock signal defines a time when the data signals or information contained in the signaling group is valid. In one exemplary embodiment of the present invention, the transmitter unit 103 is a processor, such as a microprocessor, a digital signal processor, a reduced instruction set processor, or a complex instruction set computing system. In an alternate exemplary embodiment, the transmitter unit 103 is a transceiver unit capable of transmitting and receiving information on the transmission medium 105. The present invention is not limited to a particular type of transceiver unit. Exemplary transceiver units suitable for use in connection with the present invention include processors and communications systems, such as cell phones and personal digital assistants. In still another exemplary embodiment, the transmitter 103 is a data storage device, such as a memory. Exemplary memories suitable for use in connection with the present invention include but are not limited to dynamic random-access memories, static random-access memories, programmable read only memories, and electrically programmable read-only memories.

The transmission medium 105 provides a path for transmitting signals from the transmitter unit 103 to the receiver unit 107. In one exemplary embodiment of the present invention, the transmission medium 105 is fabricated from conductive elements that couple the transmitter unit 103 to the receiver unit 107. The present invention is not limited to use in connection with a particular type of conductive element. In one embodiment, the transmission medium 105 is fabricated from copper conductors formed on a substrate, such as on a circuit board. In an alternate embodiment, the transmission medium 105 is fabricated from copper alloy wires formed into a cable. In still another alternate embodiment, the transmission medium 105 is fabricated from a plurality of metal interconnects fabricated on a substrate, such as a semiconductor substrate or a ceramic substrate. Each of the plurality of metal interconnects is typically a thin, narrow metal layer fabricated on the substrate for the purpose of interconnecting electronic circuits. In another exemplary embodiment of the present invention, the transmission medium 105 comprises fiber optic cables or interconnects. In still another exemplary embodiment of the present invention, the transmission medium 105 comprises a free space path. In this embodiment, the transmitter unit 103 and the receiver unit 107 can exchange information at frequencies not generally transmitted over a conductive material or a fiber optic cable.

The receiver unit 107 is an electronic system capable of receiving information or data transmitted by the transmitter unit 103. In one embodiment, the receiver unit 107 includes one or more first-in-first-out (FIFO) units 109 coupled to a synchronizer unit 111. Each of the one or more FIFO units 109 is a buffer capable of storing information or data received from the transmitter unit 103. In one exemplary embodiment of the present invention, the receiver unit 107 includes a processor, such as a microprocessor, a digital signal processor, a reduced instruction set processor, or a complex instruction set computing system. In an alternate exemplary embodiment, the receiver unit 107 includes a transceiver unit capable of transmitting and receiving information over the transmission medium 105. The present invention is not limited to a particular type of transceiver unit. Exemplary transceiver units suitable for use in connection with the present invention include processors and communications systems, such as cell phones and personal digital assistants. In still another exemplary embodiment, the receiver unit 107 is a data storage device, such as a memory. Exemplary memories suitable for use in connection with the present invention include but are not limited to dynamic random-access memories, static random-access memories, programmable read only memories, and electrically programmable read-only memories.

Figure 2:
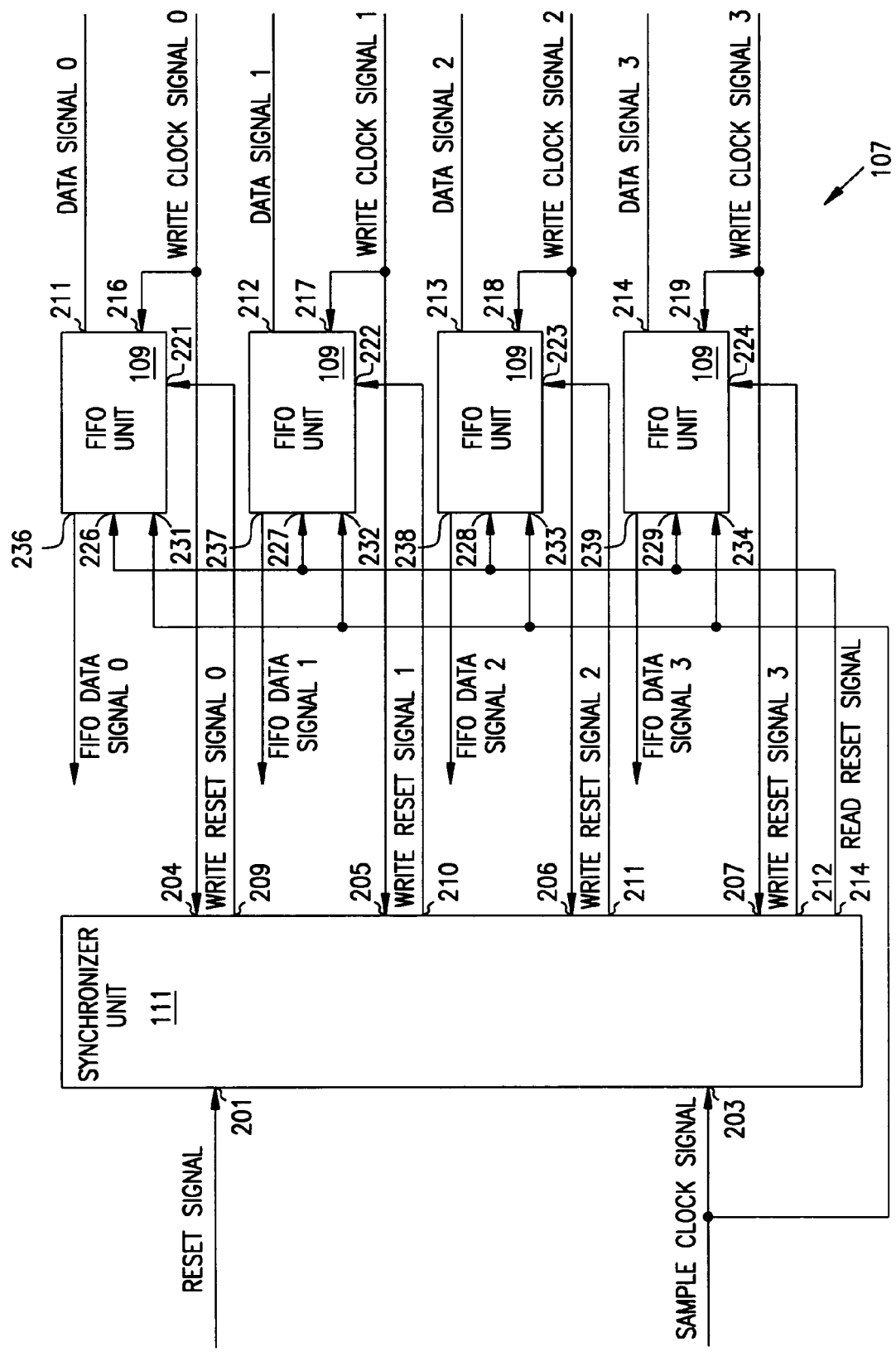
FIG. 2 is a block diagram illustrating one embodiment of a receiver unit shown in FIG. 1.

FIG. 2 is a block diagram of one embodiment of the receiver unit 107 shown in FIG. 1. The receiver unit 107 includes the synchronizer unit 111 and the one or more FIFO units 109 coupled to the synchronizer unit 111. The synchronizer unit 111 receives as inputs a RESET SIGNAL at node 201, a SAMPLE CLOCK SIGNAL at node 203, and a plurality of WRITE CLOCK SIGNALS 0-3 at nodes 204-207. The receiver unit 107 generates WRITE RESET SIGNALS 0-3 at nodes 209-212 of the synchronizer unit 111, and a READ RESET SIGNAL at node 214 of the synchronizer unit 111. The plurality of FIFO units 109 receive as inputs a plurality of DATA SIGNALS 0-3 at nodes 211-214, the plurality of WRITE CLOCK SIGNALS 0-3 at nodes 216-219, a plurality of WRITE RESET SIGNALS at nodes 221-224, the READ RESET SIGNAL at nodes 226-229, and the SAMPLE CLOCK SIGNAL at node 231-234.

In operation, the plurality of FIFO units 109 receive the plurality of DATA SIGNALS 0-3 at the nodes 211-214 and the plurality of WRITE CLOCK SIGNALS 0-3 at the nodes 216-219, as inputs from transmitter unit 103 (shown in FIG. 1). Each of the plurality of WRITE CLOCK SIGNALS 0-3 received at the nodes 216-219 is associated with one or more data signals. For example, WRITE CLOCK SIGNAL 0 at the node 216 is associated with DATA SIGNAL 0 received by one of the one or more FIFO units 109 at the node 211. A transition on any of the WRITE CLOCK SIGNALS 0-3 at the nodes 216-219 defines a time when the associated data signal is valid. The plurality of WRITE CLOCK SIGNALS 0-3 at the nodes 216-219 clock the DATA SIGNALS 0-3 at the nodes 211-214 into a first stage of the FIFO units 109. The synchronizer unit 111 receives the RESET SIGNAL at the node 201, the SAMPLE CLOCK SIGNAL at the node 203, and the WRITE CLOCK SIGNALS 0-3 at the nodes 209-212 and generates the READ RESET SIGNAL at the node 214 and the WRITE RESET SIGNALS 0-3 at the nodes 209-212. The RESET SIGNAL at the node 201 and the SAMPLE CLOCK SIGNAL at the node 203 are typically local signals. The frequency of the SAMPLE CLOCK SIGNAL at the node 203, in one embodiment, is about twice the frequency of the plurality of WRITE CLOCK SIGNALS 0-3. The READ RESET SIGNAL generated at the node 214 is positioned with respect to the plurality of WRITE RESET SIGNALS 0-3 at the nodes 209-212 and has a latency with respect to each of the plurality of WRITE RESET SIGNALS 0-3 at the nodes 209-212 of less than or equal to one clock cycle. A clock cycle is the time between successive rising edges of a clock signal or the time between successive falling edges of a clock signal. The READ RESET SIGNAL at the node 214 of the FIFO units 109 resets the DATA OUTPUT SIGNALS 0-3 at the nodes 226-229 of the FIFO unit 109. The SAMPLE CLOCK SIGNAL at the node 203 clocks the data last written into the plurality of FIFO units 109 from the FIFO DATA SIGNALS 0-3 at the nodes 236-239 of the plurality of FIFO units 109. Finally, the WRITE RESET SIGNALS 0-3 at nodes 221-223 reset the data at the first stage of the FIFO units 109.

Figure 3:
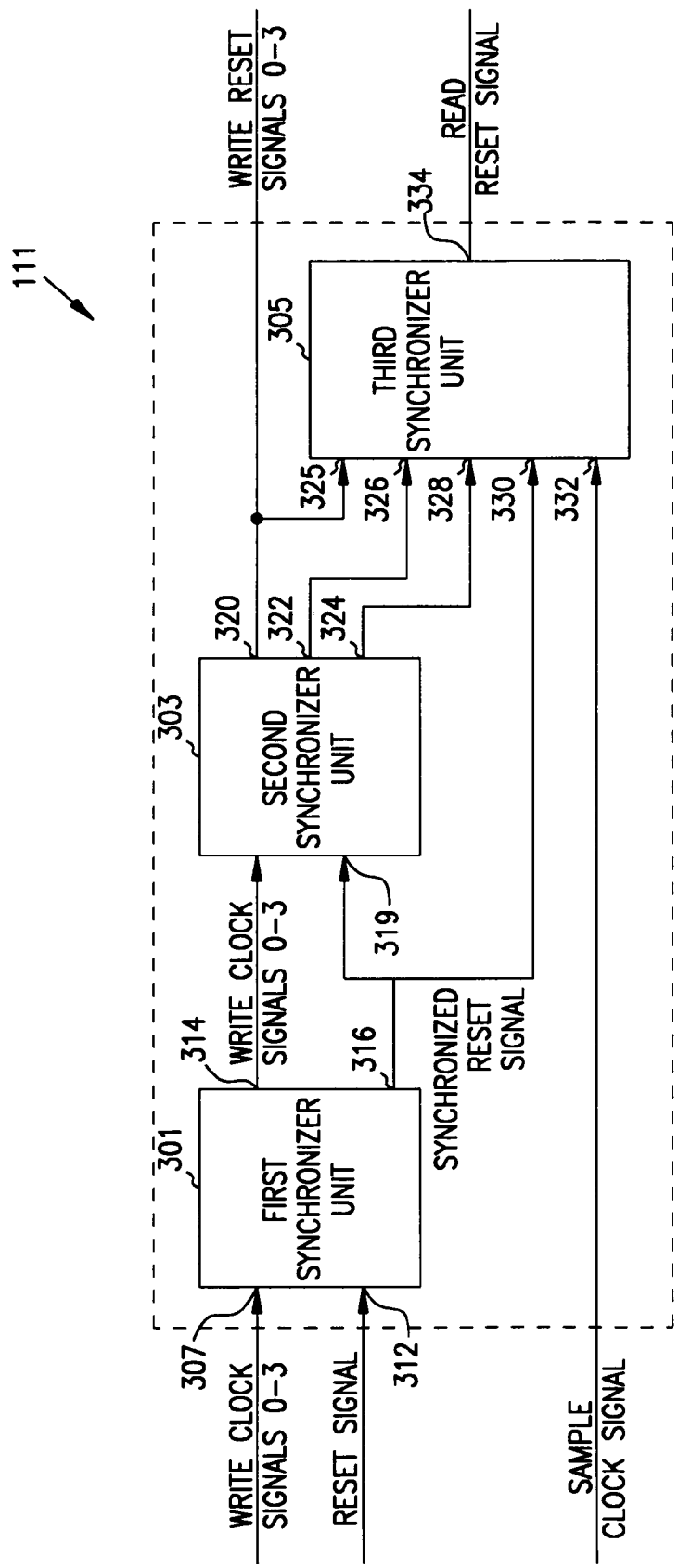
FIG. 3 is a block diagram illustrating one embodiment of a synchronizer unit shown in FIG. 2.

FIG. 3 is a block diagram of one embodiment of a synchronizer unit 111 shown in FIG. 2. Synchronizer unit 111 comprises a first synchronizer unit 301, a second synchronizer unit 303, and a third synchronizer unit 305. The first synchronizer unit 301 receives WRITE CLOCK SIGNALS 0-3 at node 307 and a RESET SIGNAL at node 312 and generates a SYNCHRONIZED RESET SIGNAL at node 316. The WRITE CLOCK SIGNALS at node 314 are passed through the first synchronizer unit 301 from node 307. The second synchronizer unit 303 is coupled to the first synchronizer unit 301. The second synchronizer unit 303 receives the WRITE CLOCK SIGNALS 0-3 at node 318, the SYNCHRONIZED RESET SIGNAL at node 319, and generates WRITE RESET SIGNALS 0-3 at node 320, the WRITE RESET SIGNALS 0-3 (minus three gate delays) at node 322, and the WRITE RESET SIGNALS 0-3 (minus two gate delays) at node 324. The third synchronizer unit 305 is coupled to the second synchronizer unit 303. The third synchronizer unit 305 receives the WRITE RESET SIGNALS 0-3 at node 325, the WRITE RESET SIGNALS 0-3 (minus three gate delays) at node 326, the WRITE RESET SIGNALS 0-3 (minus two gate delays) at node 328, the SYNCHRONIZED RESET SIGNAL at node 330, and the SAMPLE CLOCK SIGNAL at node 332, and generates a READ RESET SIGNAL at node 334. The READ RESET SIGNAL at node 334 is positioned with respect to the WRITE RESET SIGNALS 0-3 at node 320, and the READ RESET SIGNAL at node 334 has a latency with respect to the each of the WRITE RESET SIGNALS 0-3 at node 320 of less than or equal to one clock cycle.

Figure 4:
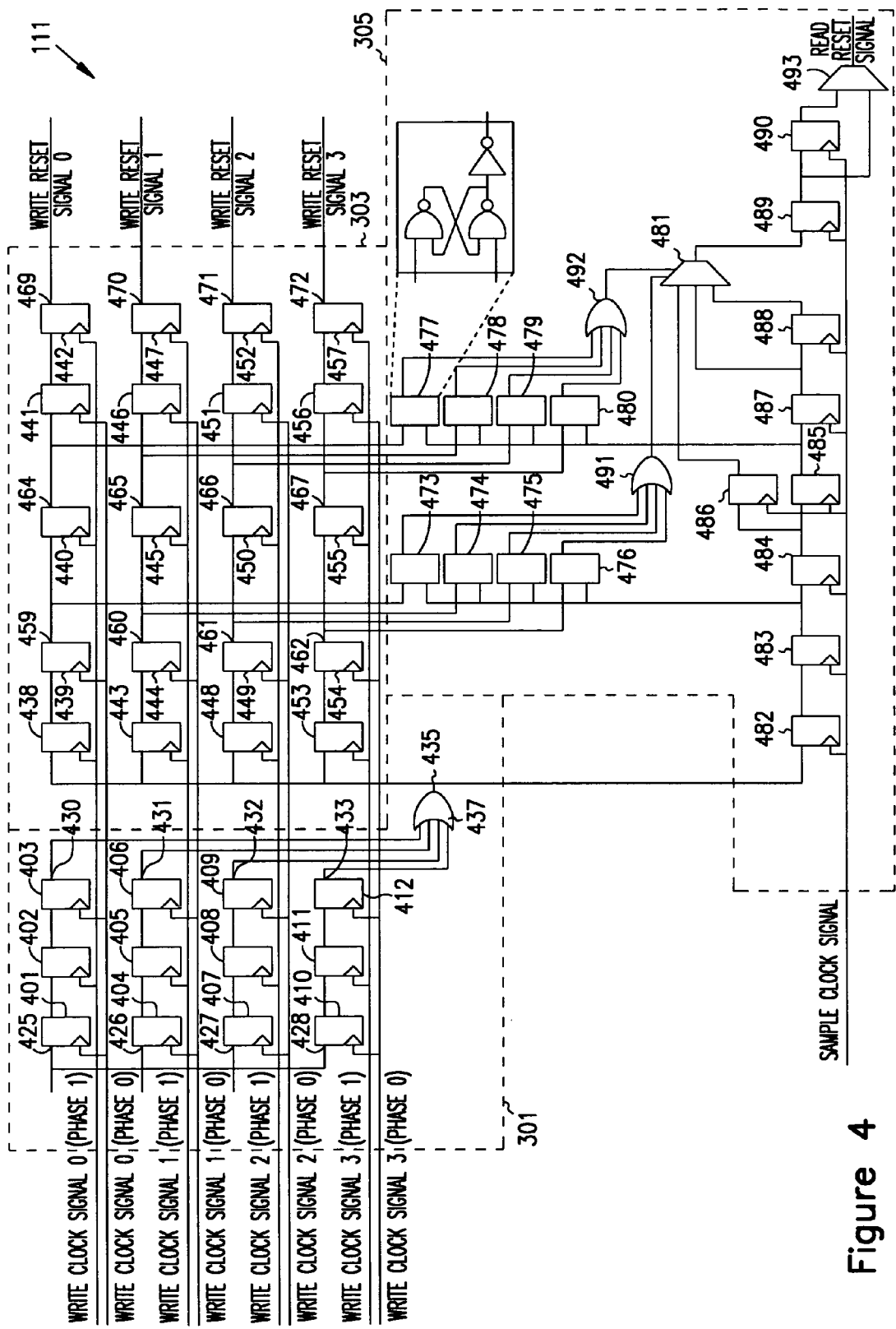
FIG. 4 is a logic diagram of one embodiment of the synchronizer unit shown in FIG. 3.

FIG. 4 is a logic diagram of one embodiment of the synchronizer unit 111 shown in FIG. 3. The synchronizer unit 111 includes the first synchronizer unit 301, the second synchronizer unit 303, and the third synchronizer unit 305.

The first synchronizer unit 301 includes four data paths. The first data path includes three serially connected D flip-flops 401-403. The second data path includes three serially connected D flip-flops 404-406. The third data path includes three serially connected D flip-flops 407-409. And the fourth data path includes three serially connected D flip-flops 410-412.

The first synchronizer unit 301 receives a plurality of clock signals, such as the WRITE CLOCK SIGNALS 0-3 at nodes 413-424, and the RESET SIGNAL at nodes 425-428. In one embodiment, the plurality of clock signals has a frequency of between about one gigahertz and about five gigahertz. The plurality of clock signals are preferably two-phase clocks or a pair of complementary clock signals. A two-phase clock or a pair of complementary clock signals includes a first clock signal and a second clock signal. The first clock signal and the second clock signal have the same frequency but are 180 degrees out of phase (one phase is designated phase 0 and one phase is designated phase 1). In one embodiment of the present invention, the pair of complementary clock signals have a skew of less than 90 degrees. The D flip-flops 401-403 in the first data path receive the WRITE CLOCK SIGNAL 0 (phase 0) and the WRITE CLOCK SIGNAL 0 (phase 1). The D flip-flops 401 and 403 receive the WRITE CLOCK SIGNAL 0 (phase 0) at nodes 413 and 415, and D flip-flop 402 receives WRITE CLOCK SIGNAL 0 (phase 1) at node 414. The D flip-flops 404-406 in the second data path receive the WRITE CLOCK SIGNAL 1 (phase 0) and the WRITE CLOCK SIGNAL 1 (phase 1). The D flip-flops 404 and 406 receive the WRITE CLOCK SIGNAL 1 (phase 0) at nodes 416 and 418, and D flip-flop 405 receives WRITE CLOCK SIGNAL 1 (phase 1) at node 417. The D flip-flops 407-409 in the third data path receive the WRITE CLOCK SIGNAL 2 (phase 0) and the WRITE CLOCK SIGNAL 2 (phase 1). The D flip-flops 407 and 409 receive WRITE CLOCK SIGNAL 2 (phase 0) at nodes 419 and 421, and the D flip-flop 408 receives WRITE CLOCK SIGNAL 2 (phase 1) at node 420. The D flip-flops 410-412 in the fourth data path receive the WRITE CLOCK SIGNAL 3 (phase 0) and the WRITE CLOCK SIGNAL 3 (phase 1). The D flip-flops 410 and 412 receive the WRITE CLOCK SIGNAL 3 (phase 0) at nodes 422 and 424, and the D flip-flop 411 receives the WRITE CLOCK SIGNAL 3 (phase 1) at node 423. Each of the D flip-flops 401, 404, 407, and 410 receive the RESET SIGNAL at nodes 425-428.

In operation, the first synchronizer unit 301 generates SYNCHRONIZED RESET SIGNALS 0-3 at nodes 430-433, and a SYNCHRONIZED RESET SIGNAL at node 435. The SYNCHRONIZED RESET SIGNALS 0-3 at the nodes 430-433 are generated by clocking the RESET SIGNAL at the nodes 425-428 through the first data path, the second data path, the third data path, and the fourth data path using the WRITE CLOCK SIGNALS 0-3 (phase 0) and the WRITE CLOCK SIGNALS 0-3 (phase 1). The SYNCHRONIZED RESET SIGNALS 0-3 at nodes 430-433 are ORed together at OR gate 437 to generate the SYNCHRONIZED RESET SIGNAL are the node 435.

Figure 5:
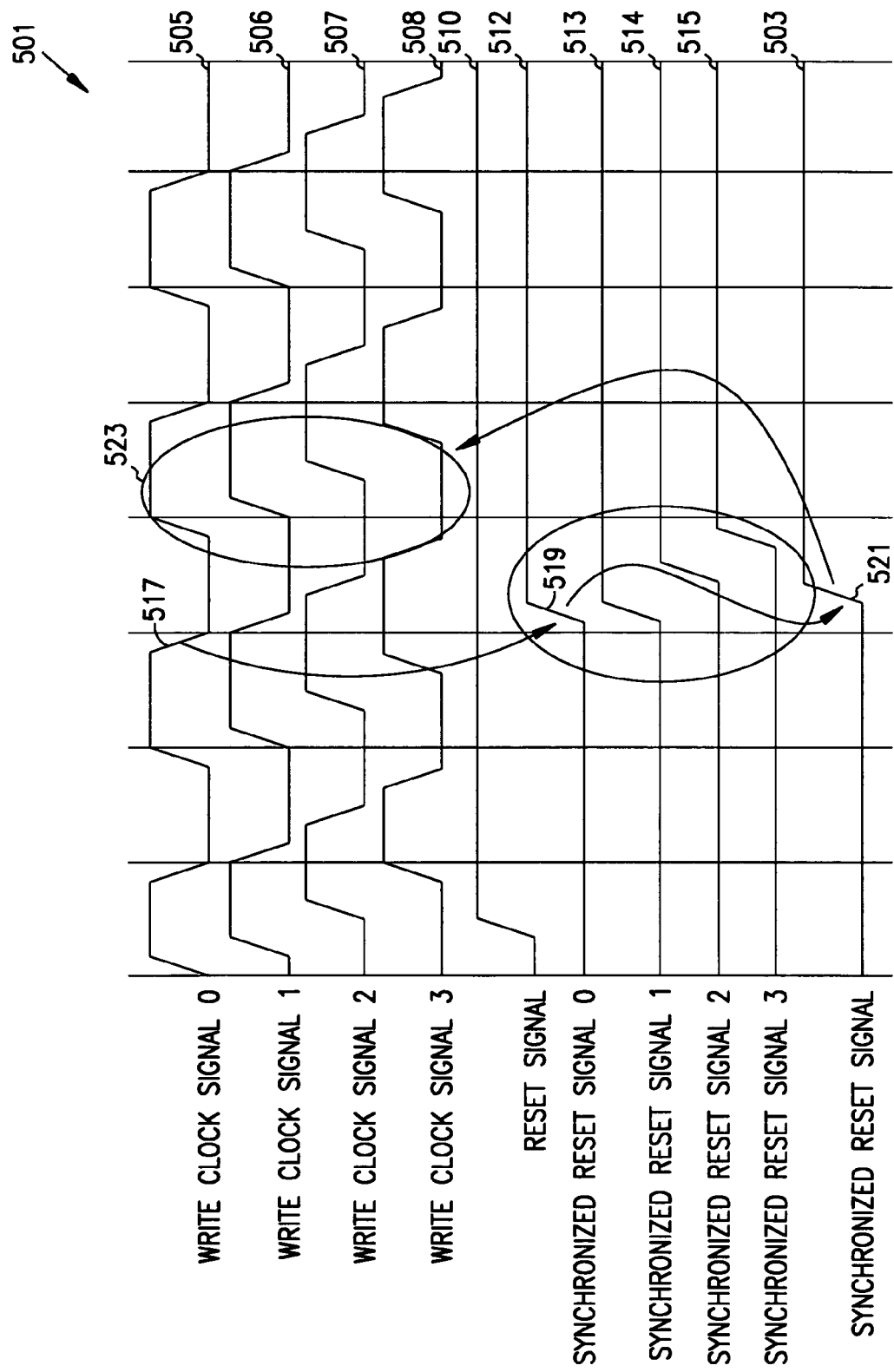
FIG. 5 is a timing diagram showing the generation of a synchronized reset signal in the synchronizer unit shown in FIG. 4.

FIG. 5 is a timing diagram 501 showing the generation of the SYNCHRONIZED RESET SIGNAL (node 435 in FIG. 4) 503. The timing diagram 501 includes WRITE CLOCK SIGNALS 0-3 (nodes 413, 416, 419, and 422 in FIG. 4) 505-508, RESET SIGNAL (nodes 425-428 in FIG. 4) 510, SYNCHRONIZED RESET SIGNALS 0-3 (nodes 430-433 in FIG. 4) 512-515, and the SYNCHRONIZED RESET SIGNAL (node 435 in FIG. 4) 503. The SYNCHRONIZED RESET SIGNAL 503 is generated by ORing the SYNCHRONIZED RESET SIGNALS 0-3 512-515. As can be seen from the timing diagram 501, a falling edge 517 of the WRITE CLOCK SIGNAL 0 triggers a rising edge 519 of the SYNCHRONIZED RESET SIGNAL 0 512, which triggers a rising edge 521 of the SYNCHRONIZED RESET SIGNAL 503, which is ahead of each rising edge 523 of each of the WRITE CLOCK SIGNALS 0-3 505-508 that occur after the rising edge 521 of the SYNCHRONIZED RESET SIGNAL 503.

Referring again to FIG. 4, the second synchronizer unit 303 includes four data paths. The first data path includes five serially connected D flip-flops 438-442. The second data path includes five serially connected D flip-flops 443-447. The third data path includes five serially connected D flip-flops 448-452. And the fourth data path includes five serially connected D flip-flops 453-457.

The second synchronizer unit 303 receives the WRITE CLOCK SIGNALS 0-3 at D flip-flops 438-457 and the SYNCHRONIZED RESET SIGNAL at D flip-flops 438, 443, 448 and 453. The D flip-flops 438-442 in the first data path receive the WRITE CLOCK SIGNAL 0 (phase 0) and the WRITE CLOCK SIGNAL 0 (phase 1). The D flip-flops 443-447 in the second data path receive the WRITE CLOCK SIGNAL 1 (phase 0) and the WRITE CLOCK SIGNAL 1 (phase 1). The D flip-flops 448-452 in the third data path receive the WRITE CLOCK SIGNAL 2 (phase 0) and the WRITE CLOCK SIGNAL 2 (phase 1). The D flip-flops 453-457 in the fourth data path receive the WRITE CLOCK SIGNAL 3 (phase 0) and the WRITE CLOCK SIGNAL 3 (phase 1). Each of the D flip-flops 438, 443, 448, and 453 receive the SYNCHRONIZED RESET SIGNAL generated at the first synchronizer unit 301 at node 435.

In operation, the second synchronizer unit 303 generates the WRITE RESET SIGNALS 0-3 (minus three gate delays) at nodes 459-462, the WRITE RESET SIGNALS 0-3 (minus two gate delays) at nodes 464-467, and WRITE RESET SIGNALS 0-3 at nodes 469-472. The WRITE RESET SIGNALS 0-3 (minus three gate delays) at nodes 459-462, the WRITE RESET SIGNALS 0-3 (minus two gate delays) at nodes 464-467, and the WRITE RESET SIGNALS 0-3 at nodes 469-472 are generated by clocking the SYNCHRONIZED RESET SIGNAL at the node 435 through the first data path, the second data path, the third data path, and the fourth data path using the WRITE CLOCK SIGNALS 0-3 (phase 0) and the WRITE CLOCK SIGNALS 0-3 (phase 1).

The third synchronizer 305 includes a first plurality of set-reset flip-flops 473-476, a second plurality of set-reset flip-flops 477-480, a multiplexor 481, and a plurality of serially connected D flip-flops 482-490. The first plurality of set-reset flip-flops 473-476 are coupled to a first control port of the multiplexor 481 through an OR gate 491, and the second plurality of set-reset flip-flops 477-480 are coupled to a second control port of the multiplexor 481 through an OR gate 492. The multiplexor 481 couples D flip-flop 486, D flip-flop 487, or D flip-flop 488 to the D flip-flop 489 in response to signals at the first control port and the second control port of the multiplexor 481. The inputs ports of the multiplexor 481 are coupled to the D flip-flop 486, the D flip-flop 487, and the D flip-flop 488. The multiplexor 481 controls the number of D flip-flops in the data path between the D flip-flop 484 and the D flip-flop 489.

Each of the set inputs of the first plurality of set-reset flip-flops 473-476 is coupled to the WRITE RESET SIGNALS (0-3) (minus three gate delays) at the nodes 459-462 of the second synchronizer unit 303. Each of the reset inputs of the first plurality of set-reset flip-flops 473-476 is coupled to an output port of the D flip-flop 483. The output ports of the set-reset flip-flops 473-476 are coupled to the input port of the OR gate 491, and the output port of the OR gate 491 is coupled to a first control input of the multiplexor 481.

Each of the set inputs of the second plurality of set-reset flip-flops 477-480 is coupled to the WRITE RESET SIGNALS (0-3) (minus two gate delays) at the nodes 464-467 of the second synchronizer unit 303. Each of the reset inputs of the second plurality of set-reset flip-flops 477-480 is coupled to an output port of the D flip-flop 485. The output ports of the set-reset flip-flops 477-480 are coupled to the input port of the OR gate 492, and the output port of the OR gate 492 is coupled to a second control input of the multiplexor 481.

A data port of the D flip-flop 482 of the plurality of serially connected flip-flops 482-490 is coupled to the SYNCHRONIZED RESET SIGNAL at node 435 of the first synchronizer unit 301. Each of the clock inputs of the D flip-flops 482-490 in the plurality of serially connected D flip-flops 482-490 is coupled to the SAMPLE CLOCK SIGNAL.

In operation, the SAMPLE CLOCK SIGNAL clocks the SYNCHRONIZED RESET SIGNAL at node 435 through the serially connected D flip-flops 482-490. When the SYNCHRONIZED RESET SIGNAL at node 435 is clocked to the output of the D flip-flop 483, each of the first plurality of set-reset flip-flops 473-476 is set. When the SYNCHRONIZED RESET SIGNAL at node 435 is clocked to the output of the D flip-flop 485, each of the second plurality of set-reset flip-flops 477-480 is set. The WRITE RESET SIGNALS (0-3) (minus three gate delays) at nodes 459-462 reset each of the first plurality of set-reset flip-flops 473-476. The WRITE RESET SIGNALS (0-3) (minus two gate delays) at nodes 464-467 reset each of the second plurality of set-reset flip-flops 477-480. When at least one of the first plurality of set-reset flip-flops 473-476 is set, and at least one of the second plurality of set-reset flip-flops 477-480 is set, the output of the D flip-flop 488 is coupled by the multiplexor 481 to the input of the D flip-flop 489. When at least one of the first plurality of set-reset flip-flops 473-476 is set, and none of the second plurality of set-reset flip-flops 477-480 is set, the output of the D flip-flop 487 is coupled by the multiplexor 481 to the input of the D flip-flop 489. When none of the first plurality of set-reset flip-flops 473-476 is set, the output of the D flip-flop 486 is coupled by the multiplexor 481 to the input of the D flip-flop 489. By controlling the number of D flip-flops in the data path between the D flip-flop 484 and the D flip-flop 489, the latency of the READ RESET SIGNAL at node 493 with respect to each of the WRITE RESET SIGNALS 0-3 at nodes 469-472 can be maintained at one clock cycle or less.

Figure 6:
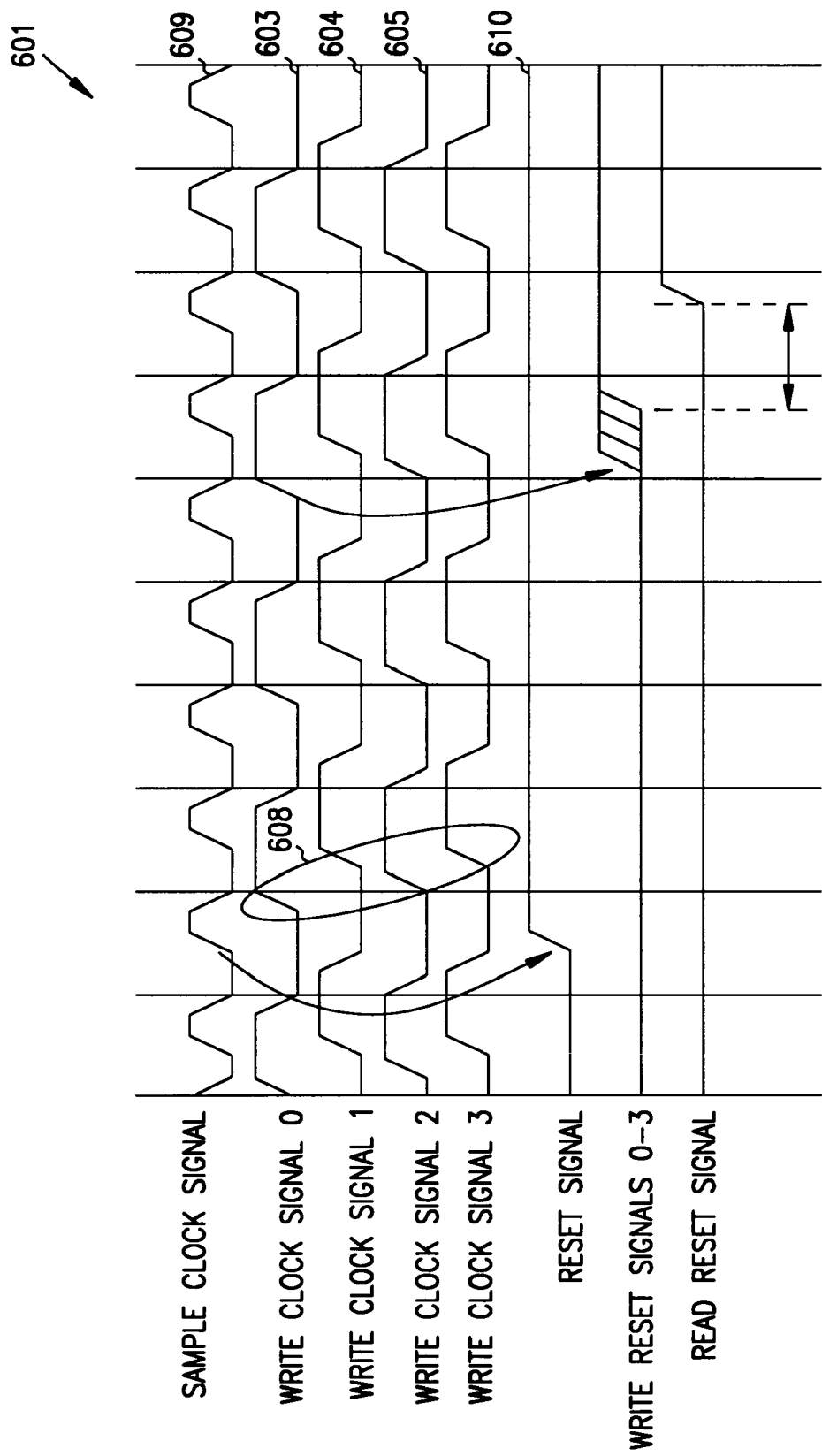
FIG. 6 is a timing diagram in which each of the WRITE CLOCK SIGNALS 0-3 has a rising edge that leads the SAMPLE CLOCK SIGNAL following the release of the RESET SIGNAL.
Figure 7:
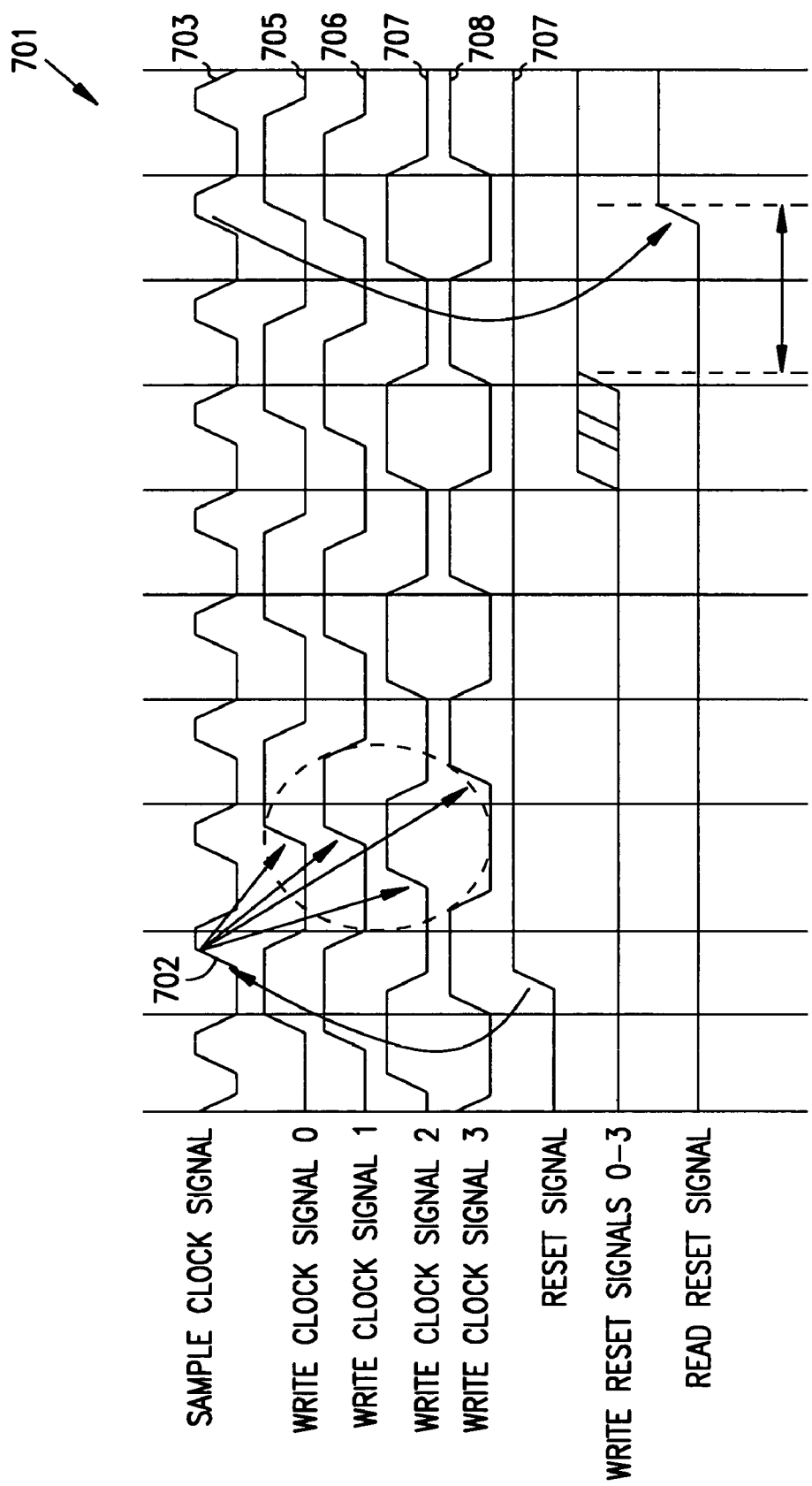
FIG. 7 is a timing diagram in which the rising edge of the SAMPLE CLOCK SIGNAL leads each of the WRITE CLOCK SIGNALS 0-3 by 1-2 clock cycles.
Figure 8:
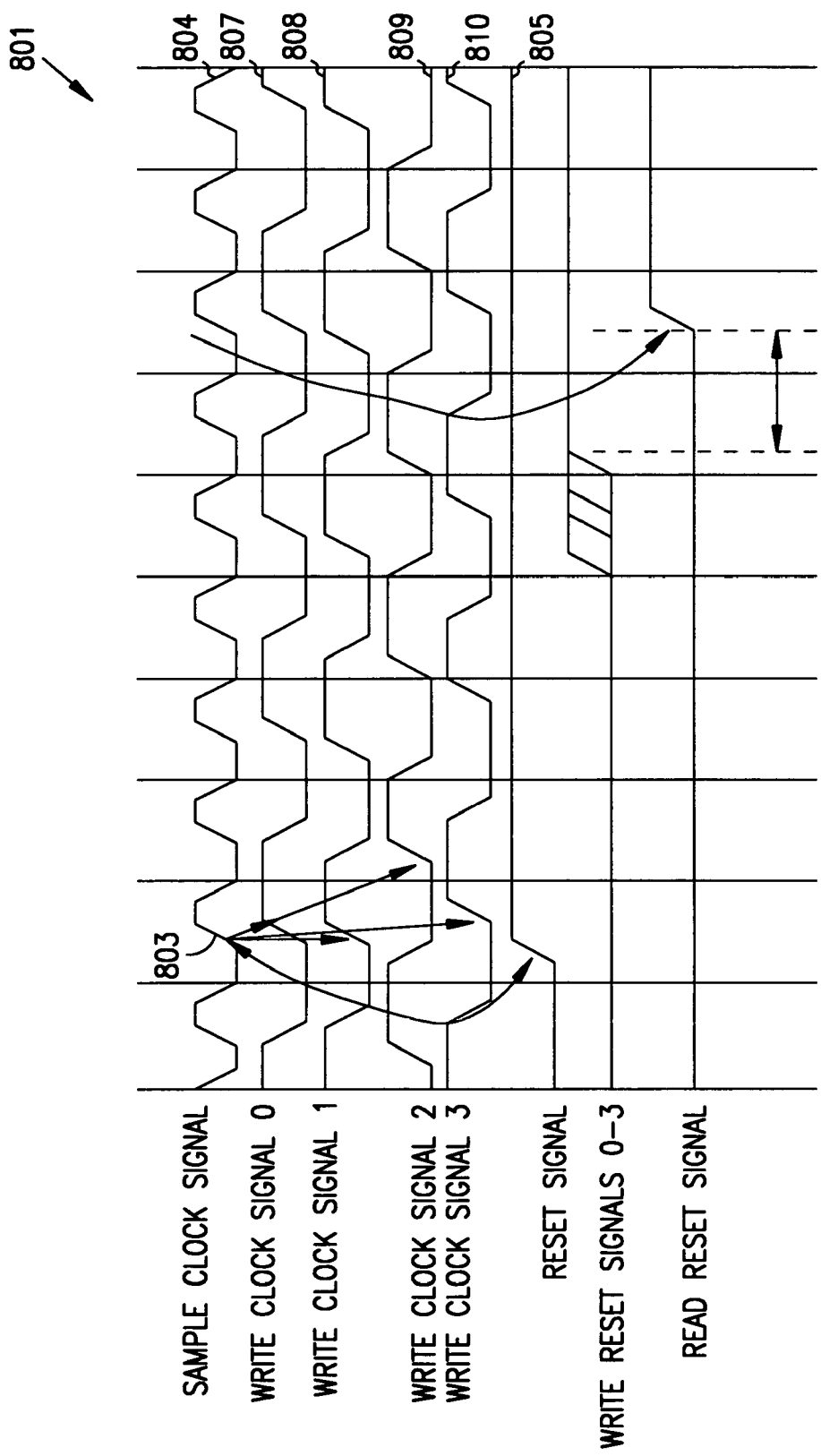
FIG. 8 is a timing diagram in which the rising edge of the SAMPLE CLOCK SIGNAL following the release of the RESET SIGNAL leads each of the WRITE CLOCK SIGNALS 0-3 by 0-1 clock cycles.

FIGS. 6, 7, and 8 illustrate three example timing diagrams showing relationships between a SAMPLE CLOCK SIGNAL and WRITE CLOCK SIGNALS 0-3, which can result in a latency between WRITE RESET SIGNALS 0-3 and the READ RESET SIGNAL of between 1 and 2 clock cycles. FIG. 6 shows a timing diagram 601 in which each of the WRITE CLOCK SIGNALS 0-3 603-606 has a rising edge 608 that leads the SAMPLE CLOCK SIGNAL 609 following the release of the RESET SIGNAL 610. Latency 611 between WRITE RESET SIGNALS 0-3 613 and READ RESET SIGNAL 615 is between 1 and 2 clock cycles. FIG. 7 shows a timing diagram 701 in which a rising edge 702 of the SAMPLE CLOCK SIGNAL 703 leads each of the WRITE CLOCK SIGNALS 0-3 705-708 by 1-2 clock cycles. Latency 711 between WRITE RESET SIGNALS 0-3 713 and READ RESET SIGNAL 715 is between 1 and 2 clock cycles. FIG. 8 shows a timing diagram 801 in which a rising edge 803 of the SAMPLE CLOCK SIGNAL 804 following the release of the RESET SIGNAL 805 leads each of the WRITE CLOCK SIGNALS 0-3 807-810 by 0-1 clock cycles. Latency 811 between WRITE RESET SIGNALS 0-3 813 and READ RESET SIGNAL 815 is between 1 and 2 clock cycles. The synchronizer unit 111 processes the SAMPLE CLOCK SIGNAL and the WRITE CLOCK SIGNALS 0-3 having the timing relationships shown in FIGS. 6, 7, and 8 and generates a READ RESET SIGNAL having a latency with respect to the WRITE RESET SIGNALS 0-3 of between 0 and 1 clock cycles.

Figure 9:
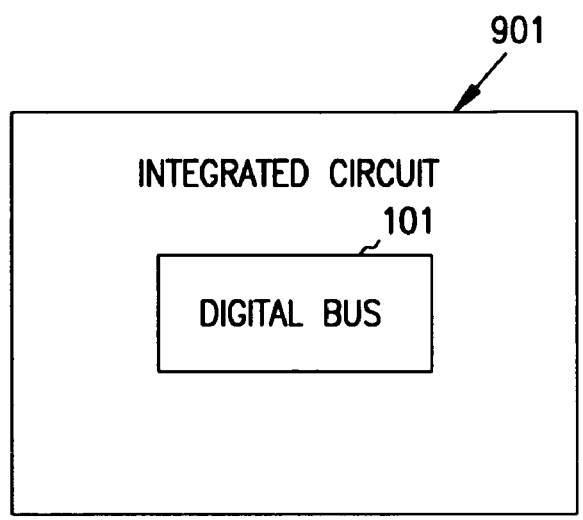
FIG. 9 is a block diagram illustrating one embodiment of an integrated circuit including the digital bus shown in FIG. 1 according to the teachings of the present invention.

FIG. 9 is a block diagram of one embodiment of an integrated circuit 901 capable of transmitting and receiving information according to the teachings of the present invention. Integrated circuit 901 includes digital bus 101 (described above and shown in FIG. 1). Each of the elements of the digital bus 101 including the transmitter unit 103 (shown in FIG. 1), the transmission medium 105 (shown in FIG. 1), and the receiver unit 107 (shown in FIG. 1) can be fabricated using integrated circuit manufacturing processes known to those skilled in the art. In one embodiment, the digital bus 101 are fabricated on a single substrate, such as silicon, and the transmission medium 105 comprises a plurality of copper interconnects. Integrated circuit 901 and digital bus 101 are not limited to being fabricated using a particular integrated circuit manufacturing process. Any process or combination of processes capable of fabricating logic circuits is suitable for use in connection with the present invention. Exemplary integrated circuit manufacturing processes suitable for use in connection with the present invention include complementary metal-oxide semiconductor (CMOS) processes, bipolar processes, and combinations of bipolar and CMOS processes.

Figure 10:
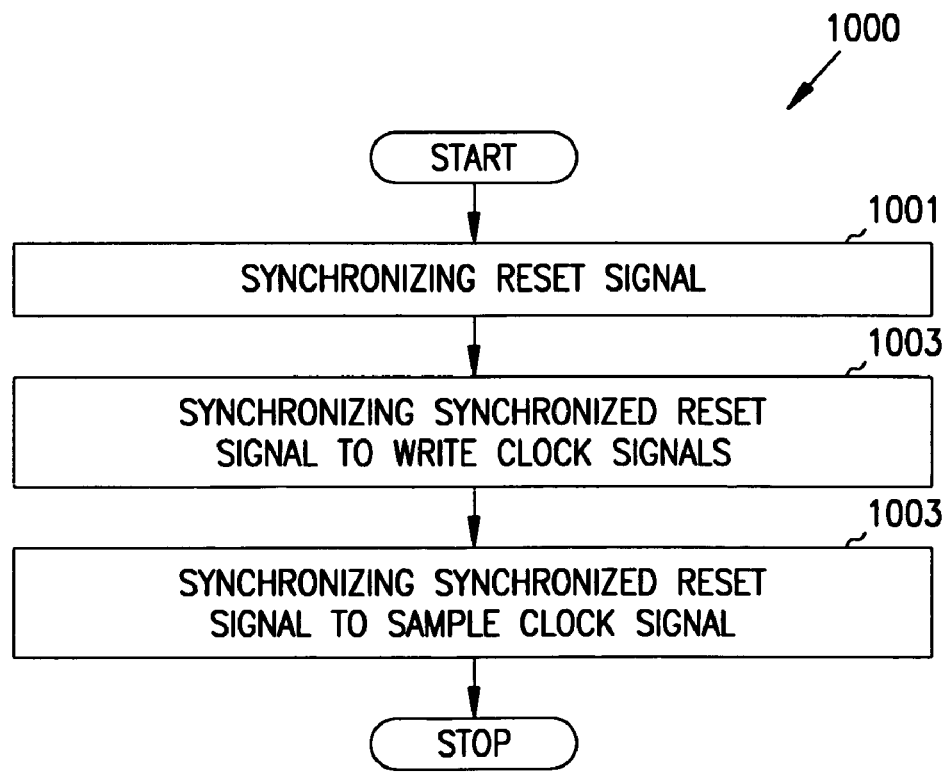
FIG. 10 is a flow diagram illustrating one embodiment of a method for transmitting and receiving information on the digital bus shown in FIG. 1.

FIG. 10 is a flow diagram 1000 illustrating one embodiment of a method for forming a synchronized reset signal. The method comprises synchronizing a first reset signal to a plurality of clock signals to form a synchronized reset signal (block 1001), synchronizing the synchronized reset signal to the plurality of clock signals to form a plurality of write reset signals (block 1003), and synchronizing the synchronized reset signal to a sample clock signal to form a read reset signal having a latency with respect to each of the plurality of write reset signals of less than or equal to one clock cycle (block 1005).

Although specific embodiments have been described and illustrated herein, it will be appreciated by those skilled in the art, having the benefit of the present disclosure, that any arrangement which is intended to achieve the same purpose may be substituted for a specific embodiment shown. This application is intended to cover any adaptations or variations of the present invention. Therefore, it is intended that this invention be limited only by the claims and the equivalents thereof.

What is claimed is:

1. A digital bus comprising:
a transmitter unit capable of generating a plurality of clock signals;
a receiver unit comprising:
one or more first-in-first-out (FIFO) units; and
a synchronizer unit coupled to the one or more FIFO units, the synchronizer unit adapted to receive the plurality of clock signals, a sample clock signal, and a reset signal and to generate a plurality of write reset signals and a read reset signal, wherein each of the plurality of write reset signals has a latency with respect to the read reset signal of less than or equal to one clock cycle, the synchronizer unit comprising:
a first synchronizer unit to receive the plurality of clock signals and the reset signal and to generate a synchronized reset signal;
a second synchronizer unit to receive the plurality of clock signals and the synchronized reset signal and to generate the plurality of write reset signals; and
a third synchronizer unit to receive the sample clock signal, the synchronized reset signal, and the plurality of write reset signals and to generate the read reset signal having a latency with respect to each of the write reset signals of less than or equal to one clock cycle; and
a transmission medium to couple the plurality of clock signals from the transmitter unit to the receiver unit.

2. The digital bus of claim 1, wherein the transmitter unit comprises a transceiver.

3. The digital bus of claim 2, wherein the transceiver comprises a processor.

4. The digital bus of claim 1, wherein each of the plurality of clock signals comprises a pair of complementary clock signals.

5. The digital bus of claim 4, wherein the pair of complementary clock signals have a skew of less than 90 degrees.

6. The digital bus of claim 4, wherein each of the plurality of clock signals has a frequency of between about 500 megahertz and about five gigahertz.

7. The digital bus of claim 1, wherein the transmission medium comprises a cable.

8. The digital bus of claim 1, wherein each of the plurality of clock signals has a clock frequency and the sample clock has a sample clock frequency that is about twice the clock frequency.

9. The digital bus of claim 1, wherein the transmission medium comprises a plurality of metal interconnects formed on a substrate.

10. The digital bus of claim 1, wherein the transmission medium comprises free space.

11. The digital bus of claim 1, wherein the receiver unit comprises a memory unit.

12. The digital bus of claim 11, wherein the memory unit comprises a dynamic random access memory.

13. An integrated circuit comprising:
a transmitter unit capable of generating a plurality of clock signals;
a receiver unit comprising:
one or more first-in-first-out (FIFO) units; and
a synchronizer unit coupled to the one or more FIFO units, the synchronizer unit adapted to receive the plurality of clock signals and a sample clock signal and to generate a plurality of write reset signals and a read reset signal, wherein each of the plurality of write reset signals has a latency with respect to the read reset signal of less than or equal to one clock cycle, the synchronizer unit comprising:
a first synchronizer unit to receive the plurality of clock signals and the reset signal and to generate a synchronized reset signal;
a second synchronizer unit to receive the plurality of clock signals and the synchronized reset signal and to generate the plurality of write reset signals; and
a third synchronizer unit to receive the sample clock signal, the synchronized reset signal, and the plurality of write reset signals and to generate the read reset signal having a latency with respect to each of the write reset signals of less than or equal to one clock cycle; and
a transmission medium to couple the plurality of clock signals from the transmitter unit to the receiver unit.

14. The integrated circuit of claim 13, wherein the transmitter unit, the receiver unit, and the transmission medium are fabricated on a single substrate.

15. The integrated circuit of claim 14, wherein the single substrate is silicon.

16. The integrated circuit of claim 13, wherein the transmission medium comprises a plurality of copper interconnects.

17. The integrated circuit of claim 13, wherein the transmitter unit comprises a memory unit.

18. The integrated circuit of claim 17, wherein the memory unit comprises a dynamic random access memory.

19. The integrated circuit of claim 17, wherein the memory unit comprises a static random access memory.

20. A synchronizer unit comprising:
a logic circuit adapted to receive a plurality of clock signals, a reset signal, and a sample clock signal and to generate a synchronized reset signal synchronized to the reset signal, a plurality of write reset signals, and a read reset signal synchronized to the plurality of write reset signals, the read reset signal having a latency with respect to each of the plurality of write reset signals of less than or equal to one clock cycles, wherein the synchronizer unit comprising:
a first synchronizer unit to receive the plurality of clock signals and the reset signal and to generate a synchronized reset signal;
a second synchronizer unit to receive the plurality of clock signals and the synchronized reset signal and to generate the plurality of write reset signals; and
a third synchronizer unit to receive the sample clock signal, the synchronized reset signal, and the plurality of write reset signals and to generate the read reset signal having a latency with respect to each of the write reset signals of less than or equal to one clock cycle.

21. The synchronizer unit of claim 20, wherein the logic circuit comprises complementary metal-oxide semiconductor logic circuits.

22. The synchronizer unit of claim 21, wherein the logic circuit comprises a plurality logic gates having a delay of less than about two nanoseconds.

23. The synchronizer unit of claim 20, wherein the first synchronizer unit comprises a plurality of clock signal paths, wherein each of the plurality of clock signal paths comprises a plurality of serially connected flip-flops, and an OR gate coupled to each of the plurality of clock signal paths, the OR gate having an output node providing the synchronized reset signal.

* * * * *